(12) United States Patent
Nimrichter et al.

(10) Patent No.: US 11,059,369 B2
(45) Date of Patent: Jul. 13, 2021

(54) DIESEL EXHAUST FLUID TANK VENTING SYSTEM

(71) Applicant: Stant USA Corp., Connersville, IN (US)

(72) Inventors: Jan Nimrichter, Karvina (CZ); Nuno Bras, Ostrava (CZ)

(73) Assignee: Stant USA Corp., Connersville, IN (US)

( * ) Notice: Subject to any disclaimer, the term of this patent is extended or adjusted under 35 U.S.C. 154(b) by 0 days.

(21) Appl. No.: 16/665,086

(22) Filed: Oct. 28, 2019

(65) Prior Publication Data
US 2020/0157991 A1    May 21, 2020

Related U.S. Application Data

(60) Provisional application No. 62/767,689, filed on Nov. 15, 2018.

(51) Int. Cl.
| | | |
|---|---|---|
| *F01N 13/00* | (2010.01) | |
| *B60K 15/035* | (2006.01) | |
| *F01N 3/20* | (2006.01) | |
| *F01N 3/035* | (2006.01) | |

(52) U.S. Cl.
CPC .. *B60K 15/03519* (2013.01); *B60K 15/03504* (2013.01); *F01N 3/2066* (2013.01); *B60K 2015/03538* (2013.01); *F01N 3/035* (2013.01); *F01N 2610/1466* (2013.01)

(58) Field of Classification Search
CPC ........ B60K 15/03504; B60K 15/03519; B60K 15/03528; F01N 2610/1406; F01N 2610/1466
See application file for complete search history.

(56) References Cited

U.S. PATENT DOCUMENTS

| | | | |
|---|---|---|---|
| 8,910,620 B2 | 12/2014 | Kraus | |
| 8,967,181 B2 | 3/2015 | Wetzel et al. | |
| 9,434,247 B2* | 9/2016 | Koukan | B60K 15/04 |
| 2006/0011257 A1 | 1/2006 | Devall | |
| 2006/0070656 A1 | 4/2006 | Crawford | |
| 2012/0186677 A1* | 7/2012 | Wetzel | B60K 15/03519 137/624.27 |
| 2015/0159529 A1* | 6/2015 | Schroeder | B60K 15/03504 96/4 |
| 2016/0290520 A1 | 10/2016 | Memmer et al. | |

FOREIGN PATENT DOCUMENTS

| | | | |
|---|---|---|---|
| CN | 202789032 U | 3/2013 | |
| DE | 102005053815 A1 * | 5/2007 | B60K 15/03504 |
| KR | 10-1510339 B1 | 4/2015 | |

OTHER PUBLICATIONS

PCT Search Report and Written Opinion completed by the ISA/KR on Feb. 27, 2020 and issued in connection with PCT/US2019/059132.

* cited by examiner

*Primary Examiner* — Jonathan R Matthias
(74) *Attorney, Agent, or Firm* — Barnes & Thornburg LLP

(57) ABSTRACT

An exhaust after-treatment system associated with a diesel engine includes a diesel exhaust fluid storage unit. The storage unit includes a diesel exhaust fluid tank and a vent system coupled to the tank and configured to regulate flow of air into the tank and fluid vapor out of the tank.

23 Claims, 7 Drawing Sheets

DIESEL EXHAUST FLUID TANK VENTING SYSTEM

PRIORITY CLAIM

This application claims priority under 35 U.S.C. § 119(e) to U.S. Provisional Application No. 62/767,689, filed Nov. 15, 2018, which is expressly incorporated by reference herein.

BACKGROUND

The present disclosure relates to systems for controlling venting of fluid vapors from a diesel exhaust fluid tank, and particularly to a multiple valve tank venting system. More particularly, the present disclosure relates to a tank-mounted tank venting control valve.

SUMMARY

An exhaust after-treatment system associated with a diesel engine includes a diesel exhaust fluid storage unit. In illustrative embodiments, the storage unit includes a diesel exhaust fluid (DEF) tank and a vent system coupled to the DEF tank and configured to regulate flow of air into the DEF tank and fluid vapor out of the DEF tank.

In illustrative embodiments, the vent system includes a diesel exhaust fluid tank venting control unit arranged to extend into an interior region of the DEF tank through a single unit-mount aperture formed in the top wall of the DEF tank. The tank venting control unit includes a fill-limit valve module located, for example, in the DEF tank and exposed to fluid vapor extant in the DEF tank, a breather-valve module located outside the DEF tank and exposed to the atmosphere, and a vapor-transfer module in fluid communication with each of the fill-limit valve and breather-valve modules.

In illustrative embodiments, the breather-valve module is located in an elevated remote location relative to the diesel exhaust fluid tank. The vapor-transfer module is located between the breather-valve module and the fill-limit valve module. The vapor-transfer module includes a short filler-neck transfer tube that is used to couple a filler neck of the diesel exhaust fluid tank and an interior region of the DEF tank in fluid communication via a vapor recirculation line that interconnects the filler-neck transfer tube and the filler neck. The vapor transfer module also includes a somewhat L-shaped breather-valve transfer tube that extends upwardly along the vapor recirculation line to communicate with the elevated breather-valve module.

In illustrative embodiments, the breather-valve module includes fluid-flow unit coupled to a free end of the breather-valve transfer tube and a unit clamp coupled to the fluid-flow unit. The fluid-flow unit is exposed to fluid vapor transmitted from the DEF tank and is also exposed to atmosphere outside of the fluid-flow unit. The unit clamp is configured to mate with the vapor recirculation line to mount the fluid-flow unit in a stationary elevated position on the vapor recirculation line away from the DEF tank.

In illustrative embodiments, the vapor-transfer module includes a cap that covers a single aperture that is formed in a top wall of the diesel exhaust fluid tank to allow the fill-limit valve module to extend downwardly from an underside of the cap into the interior region formed in the diesel exhaust fluid tank. The vapor-transfer module also includes a long breather-valve transfer tube that couples the fluid-flow unit of the breather-valve module and the interior region of the diesel exhaust fluid tank in fluid communication. That long breather-valve transfer tube provides spatial means for locating an outer chamber formed in the fluid-flow unit of the breather-valve module and exposed to atmosphere surrounding the breather-valve module at a far enough distance from the diesel exhaust fluid tank to block transfer of any sloshing liquid diesel exhaust fluid in that tank into the outer chamber of the breather-valve module where it could be discharged to the atmosphere.

In illustrative embodiments, a semi-permeable membrane is mounted in an inner chamber that is formed in the breather-valve module and exposed to diesel exhaust fluid transferred from the interior region of the diesel exhaust fluid tank via the long breather-valve transfer tube. The inner chamber is coupled in fluid communication to the outer chamber via a flow restrictor channel also formed in the fluid-flow unit of the breather-valve module. The membrane has three horizontally extending layers in an illustrative embodiment.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
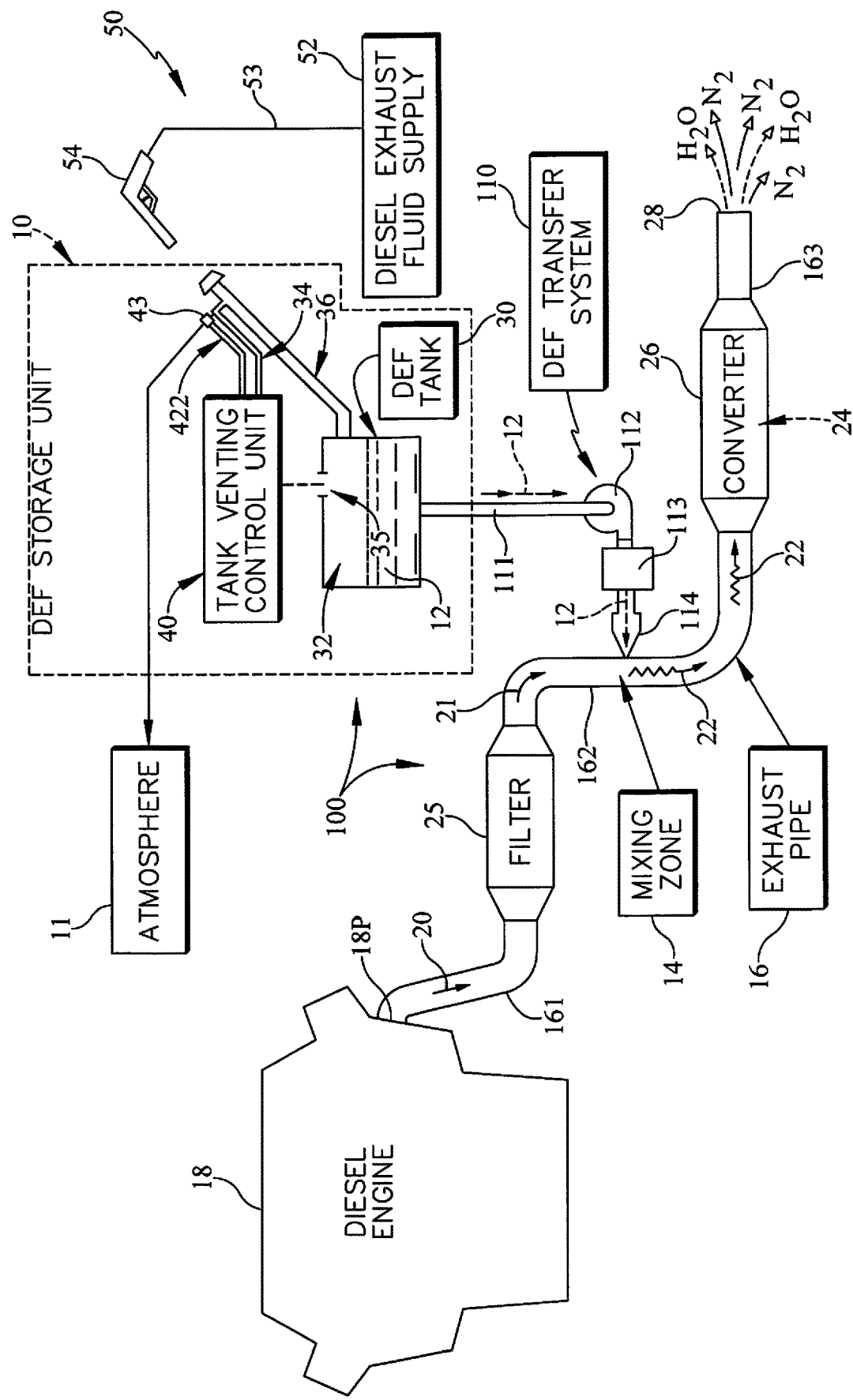
FIG. 1 is a diagrammatic view of an illustrative exhaust after-treatment system associated with a diesel engine and comprising a diesel exhaust fluid (DEF) storage unit in accordance with the present disclosure and also showing that the system includes an exhaust pipe mating with an exhaust output port formed in the diesel engine and comprising several conduits, an upstream diesel particulate filter (FILTER), and a downstream Selective Catalytic Reduction (SCR) Converter (CONVERTER), a diesel exhaust fluid supply coupled to a fluid-dispensing pump nozzle by a hose and used to supply diesel exhaust fluid to a DEF tank included in the DEF storage unit, and a DEF transfer system configured to provide means for injecting a metered flow of diesel exhaust fluid discharged from the DEF tank into a mixing zone provided in one of the exhaust pipe conduits located downstream of the filter and upstream of the CONVERTER.

A diesel exhaust fluid (DEF) storage unit 10 in accordance with the present disclosure is used to supply a metered amount of diesel exhaust fluid 12 to a mixing zone 14 in an exhaust pipe 16 coupled to a diesel engine 18 as suggested diagrammatically in FIG. 1. In mixing zone 14, diesel exhaust fluid 12 mixes with an exhaust product (i.e., NOx) 20 flowing through exhaust pipe 16 away from diesel engine 18 to produce a mixture 22 that reacts with a suitable catalyst 24 provided in a downstream Selective Catalytic Reduction (SCR) converter 26 to cause water and nitrogen to be discharged from a downstream end 28 of exhaust pipe 16 so as to minimize NOx emissions downstream from diesel engine 18.

Diesel exhaust fluid 12 is a mixture of ionized water and urea. Diesel exhaust fluid 12 is discharged as a liquid into mixing zone 14 formed in exhaust pipe 16 to mix with filtered exhaust product 21 to produce a NOx/DEF mixture 22 that is admitted into a downstream SCR converter 26 as suggested in FIG. 1. Liquid urea in diesel exhaust fluid 12 crystallizes when exposed to a sufficient amount of air so DEF storage unit 10 is a substantially sealed system designed in accordance with the present disclosure to store and maintain diesel exhaust fluid 12 in a liquid state until it is discharged from DEF tank 30 and delivered in metered amounts to mixing zone 14 in exhaust pipe 16.

Figure 2:
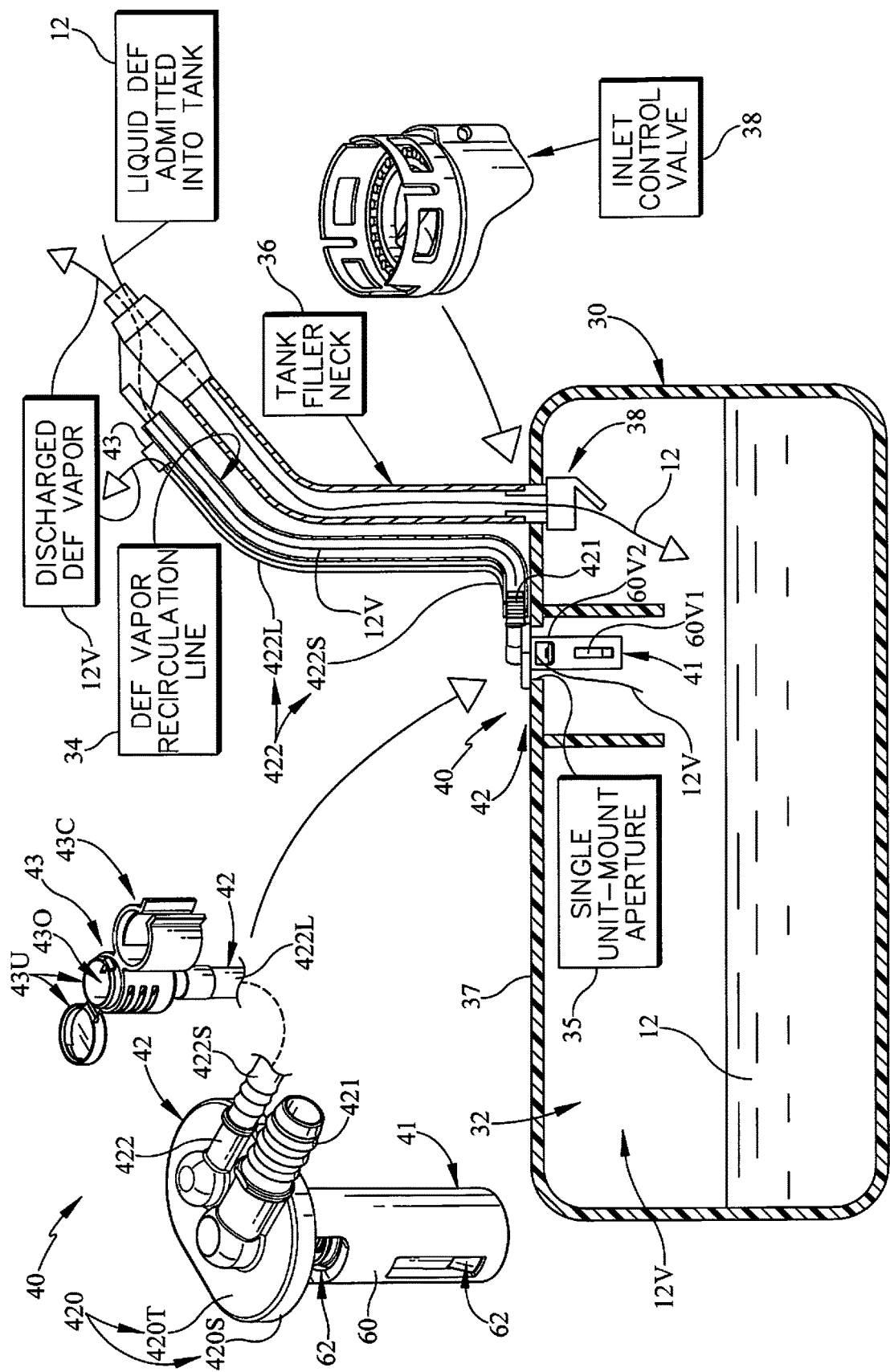
FIG. 2 is a diagrammatic view of an illustrative diesel exhaust fluid (DEF) storage unit comprising a DEF tank, a tank filler neck for the DEF tank, and a DEF tank venting control unit mounted in a single aperture formed in a top wall of the DEF tank and suggesting that an illustrative multivent valve of the type shown in FIGS. 3-6 can serve as the DEF tank venting control unit and showing that an inlet control valve is coupled to the tank filler neck to lie in an interior region of the DEF tank.
Figures 3, 4:
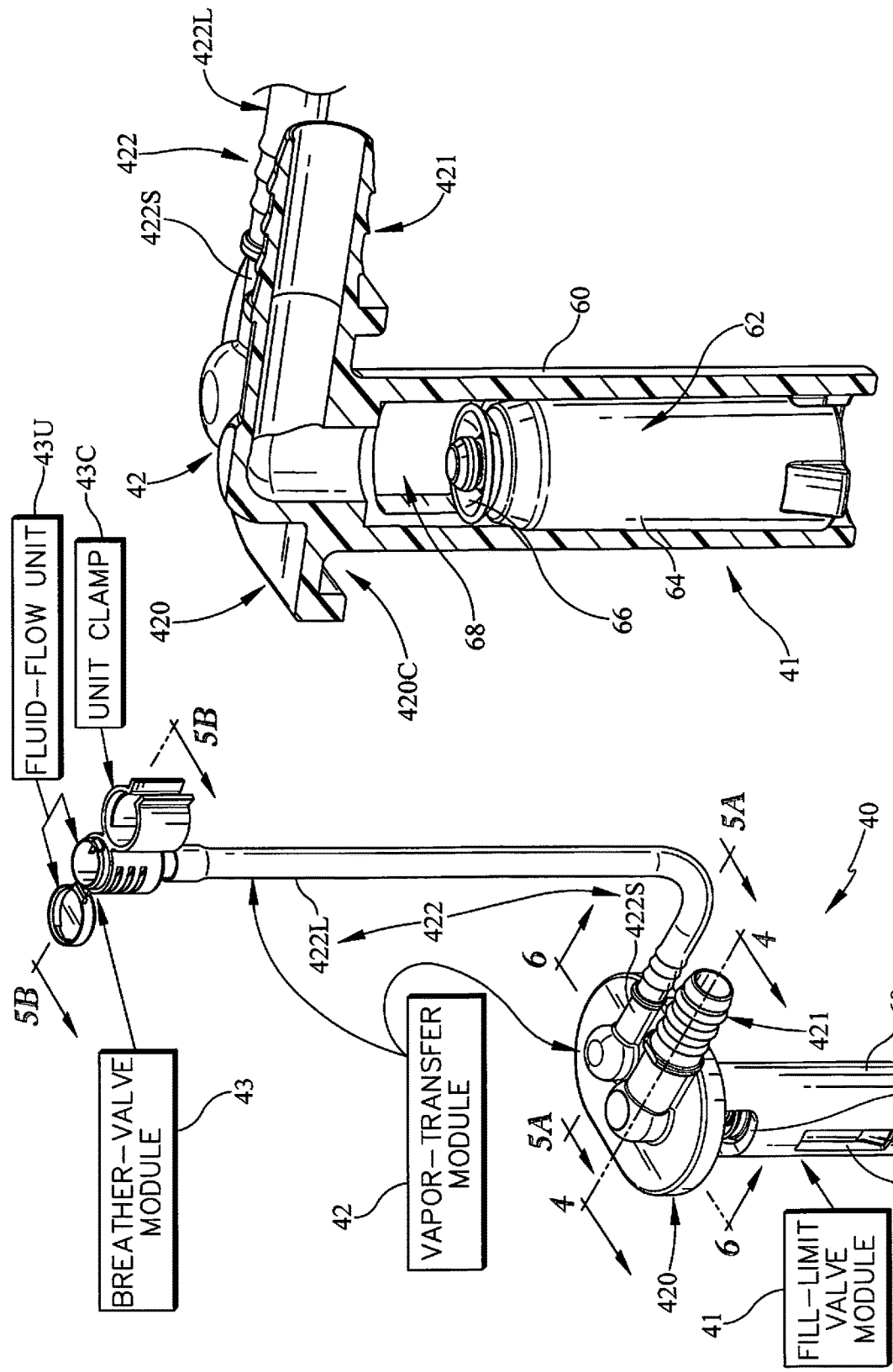
FIG. 3 is an enlarged perspective view of the illustrative DEF tank venting control unit of FIG. 2 and showing that the DEF tank venting control unit includes a fill-limit valve module comprising a float mounted for up-and-down movement in a float chamber formed in a tubular body as shown in FIG. 4 in response to rising and falling levels of diesel exhaust fluid in the DEF tank, an elevated remote breather-valve module comprising a fluid-flow unit and a unit clamp, and a vapor-transfer module interposed between the fill-limit valve module and the breather-valve module and showing that the vapor-transfer module is formed to include a short filler-neck transfer tube that is adapted to be coupled to a vapor recirculation line that leads to a tank filler neck as suggested in FIG. 2 and a tall L-shaped breather-valve transfer tube that is coupled at a lower end to a breather-valve transfer tube that lies in spaced-apart parallel relation to the filler-neck transfer tube and that is coupled at a higher end to the fluid-flow unit of the elevated remote breather-valve module.
FIG. 4 is an enlarged partial sectional view of a portion of the DEF tank venting control unit taken along line 4-4 of FIG. 3 suggesting that the short filler-neck transfer tube of the vapor-transfer module is used to conduct vapor from the DEF tank to the vapor recirculation line that leads to the tank filler neck as suggested in FIG. 2 and showing the placement of the movable float in a vertical float chamber formed in the tubular body included in the fill-limit valve module.

DEF storage unit 10 includes a diesel exhaust fluid (DEF) tank 30 and a DEF tank venting control unit 40 formed to include a fill-limit valve module 41, a vapor-transfer module 42, and an elevated remote breather-valve module 43 located in spaced-apart relation to the underlying DEF tank 30 as shown illustratively in FIGS. 2 and 3. DEF tank venting control unit 40 is mounted in a single unit-mount aperture 35 formed in DEF tank 30 as suggested in FIGS. 2 and 6.

Operation ventilation of DEF tank 30 is provided by a remote breather-valve module 43 as suggested in FIG. 2. Breather-valve module 43 is connected to DEF tank 30 by a fluid conductor that includes a long breather-valve transfer tube 422 that is included in vapor-transfer module 42 as suggested in FIG. 3. The remote breather-valve module 43 is located above DEF tank 30 away from the reach of liquid diesel exhaust fluid 12 in DEF tank 30 as suggested in FIG. 2. A low-flow option is shown, for example, in FIG. 8 in which a semi-permeable membrane 43M is included in breather-valve module 43. An alternative high-flow option is shown, for example, in FIG. 9 in which there is no semi-permeable membrane included in breather-valve module 43'.

Figure 6:
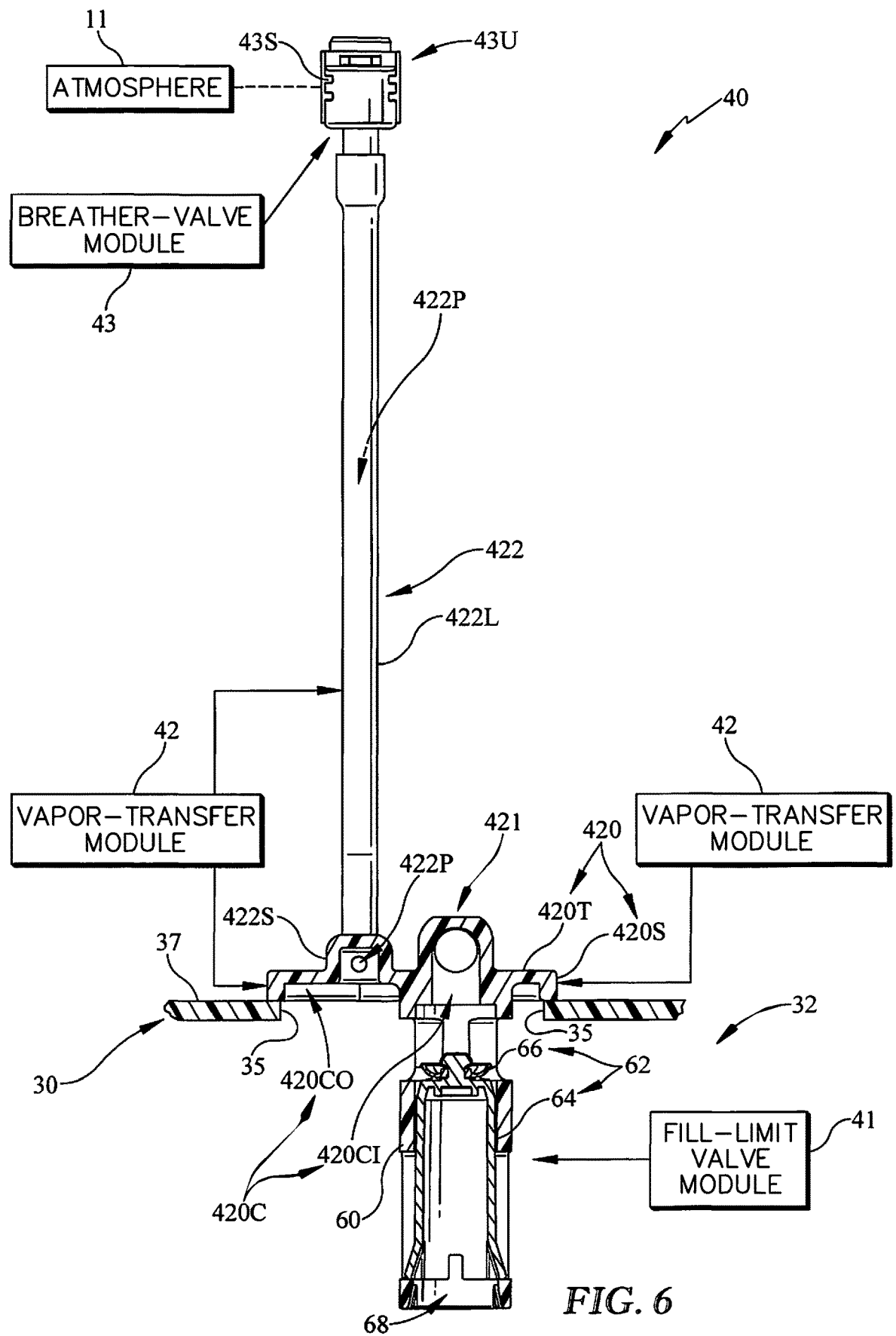
FIG. 6 is an enlarged sectional view of the DEF tank venting control unit taken along line 6-6 of FIG. 3 after it has been mounted on the top wall of the DEF tank to cause the fill-limit valve module to extend into the interior region of the DEF tank and showing that the DEF tank venting control unit further includes an elevated remote breather-valve module that is exposed to the atmosphere and a vapor-transfer module that is interposed between and coupled in fluid-communication to each of the fill-limit valve module and the elevated remote breather-valve module.

Fill-limit valve module 41 is located substantially inside DEF tank 30 as suggested in FIGS. 2 and 6. Fill-limit value module 41 provides means for controlling flow of fluid vapor 12V (e.g. ammonia gas) from an interior region 32 formed in DEF tank 30 to a vapor recirculation line 34 that is coupled in fluid communication at an inner end to vapor-transfer module 42 and at an outer end to a tank filler neck 36 that is coupled to DEF tank 30 as suggested in FIG. 2 to control shutoff of a fluid-dispensing pump nozzle 54 included in a diesel exhaust fluid (DEF) delivery system 50 during a tank-refilling activity after DEF tank 30 is full.

Vapor-transfer module 42 is interposed between fill-limit valve module 41 and the elevated remote breather-valve module 43 in an illustrative embodiment as suggested illustratively in FIGS. 3 and 6. Vapor-transfer module 42 is configured to conduct fluid vapor 12V from fill-limit valve module 41 to vapor recirculation line 34 and to conduct air and fluid vapor 12V between fill-limit valve module 41 and the elevated remote breather-valve module 43. Breather-valve transfer tube 422 includes a flexible hose 422L that can be arranged to extend along vapor recirculation line 34 in an illustrative embodiment as suggested in FIG. 2.

Figure 7:
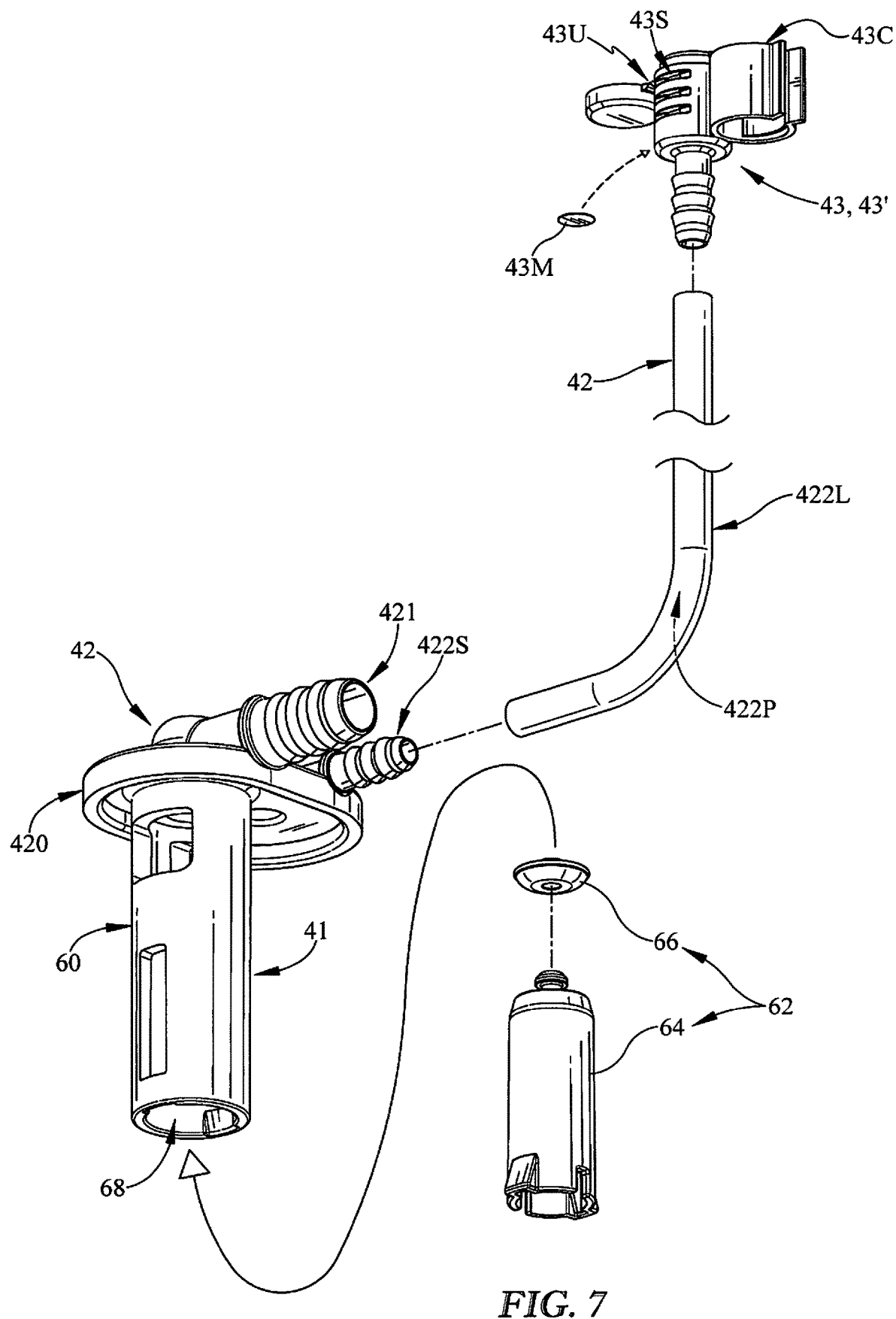
FIG. 7 is a perspective exploded view of components included in the DEF tank venting control valve of FIGS. 3-6.

Vapor-transfer module 42 includes a cap 420, a short filler-neck transfer tube 421 mounted on cap 420, and a relatively longer breather-valve transfer tube 422 mounted on cap 420 as shown in FIG. 3 and configured to locate and/or support the elevated remote breather-valve module 43 in a remote location separated from cap 420 and DEF tank 30 as suggested in FIGS. 2, 3, and 7. Owing to its long length, breather-valve transfer tube 422 minimizes the likelihood that any sloshing liquid diesel exhaust fluid 12 extant in interior region 32 of DEF tank 30 will travel out of DEF tank 30 via breather-valve transfer tube 422 to reach the elevated remote breather-valve module 43.

Cap 420 of vapor-transfer module 42 is mounted on top wall 37 of DEF tank 30 and arranged to cover the single unit-mount aperture 35 formed in top wall 37 as suggested in FIGS. 2 and 6. Cap 420 includes a top panel 420T and an endless side panel 420S coupled to a perimeter edge of top panel 420T as suggested in FIGS. 6 and 7. Top and endless side panels 420T, 420S cooperate to form an interior chamber 420C that communicates with interior region 32 of DEF tank 30 when cap 420 is mounted on top wall 37 to cover aperture 35 as suggested in FIG. 6. Interior chamber 420C comprises outer interior chamber 420OO and inner interior chamber 420CI as suggested in FIG. 6. Interior chamber 420OO of cap 420 of vapor-transfer module 42 is arranged to lie in fluid communication with long breather-valve transfer tube 422L of vapor-transfer module 42 as shown in FIG. 6.

Short filler-neck transfer tube 421 of vapor-transfer module 42 is arranged to interconnect inner interior chamber 420CI of cap 420 and a flow passageway formed in vapor recirculation line 34 as suggested in FIG. 2. Vapor 12V in interior region 32 of DEF tank 30 is discharged into vapor recirculation line 34 via fill-limit valve module 42 unless the flow passageway formed in short filler-neck transfer tube 421 is closed by a floating fill-limit valve 62 included in fill-limit module 41.

The relatively longer breather-valve transfer tube 422 of vapor-transfer module 42 is arranged to interconnect interior chamber 420C of cap 420 and the elevated remote breather-valve module 43 in fluid communication as suggested in FIGS. 2 and 3. Breather-valve transfer tube 422 is about four to five times longer than short filler-neck transfer tube 421.

Breather-valve transfer tube 422 is L-shaped in an illustrative embodiment and includes a short tubular leg 422S that is made of a rigid material and arranged to lie alongside and in laterally spaced-apart parallel relation to short transfer tube 421 as shown, for example, in FIGS. 3 and 7. Short tubular leg 422S is coupled at one end to cap 420 as shown in FIG. 3. Breather-valve transfer tube 422 also includes a relatively longer tubular leg 422L that is arranged to lie in perpendicular relation to short tubular leg 422S as suggested in FIGS. 3 and 7. Longer tubular leg 422L is made of a pliable material in an illustrative embodiment and is arranged to interconnect a distal end of short tubular leg 422S and an inner chamber 431 of the elevated remote breather-valve module 43 as suggested in FIGS. 6-9.

Breather-valve module 43 is located substantially outside DEF tank 30 in an elevated remote location in an illustrative embodiment in accordance with the present disclosure as suggested in FIGS. 2 and 6. The elevated remote breather-valve module 43 includes a fluid-flow unit 43U that is formed to include an inner chamber 431, an outer chamber 430, and a flow restrictor channel 43R arranged to interconnect inner and outer chambers 431, 430 in fluid communication as suggested in FIG. 8. Inner chamber 431 is coupled in fluid communication to a flow passageway 422P formed in transfer tube 422 as suggested in FIG. 8. Outer chamber 430 is coupled in fluid communication to atmosphere 11 via side openings 43S as suggested in FIGS. 6 and 8.

Figure 5B:
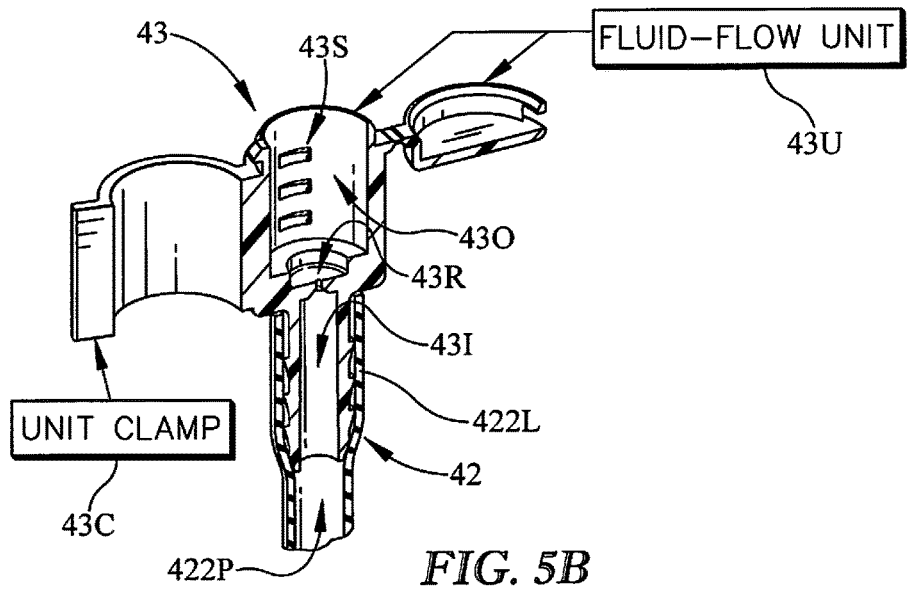
FIG. 5B is an enlarged partial sectional view of a portion of the DEF tank venting control unit taken along line 5B-5B of FIG. 3 showing that the tall L-shaped breather-valve transfer tube is used to conduct vapor that has been discharged from the DEF tank through the fluid-flow unit of the elevated remote breather-valve module to the atmosphere as suggested in FIGS. 1 and 2.

Breather-valve module 43 also includes a unit clamp 43C coupled to fluid-flow unit 43U as shown in FIGS. 3 and 5B. Unit clamp 43C is configured to mate with an outer segment of vapor recirculation line 34 in an illustrative embodiment to retain breather-valve module 43 in an elevated position above DEF tank 30 as suggested in FIG. 2.

Figure 8:
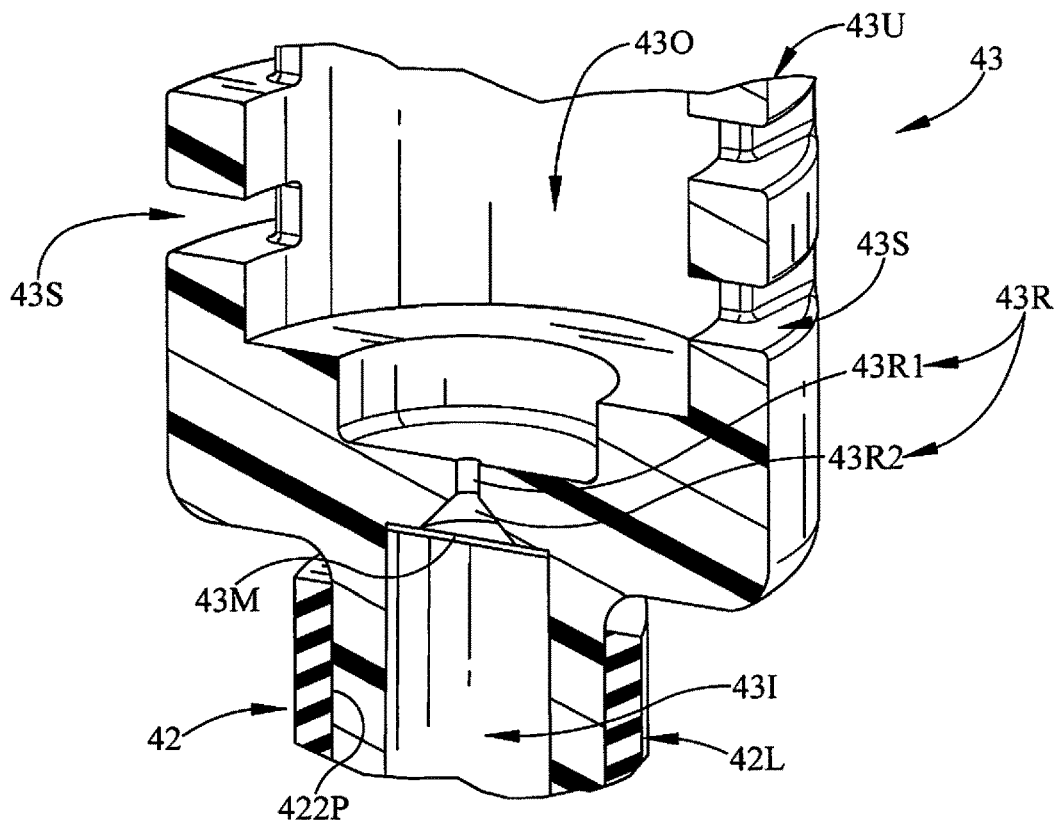
FIG. 8 is a sectional view of the elevated remote breather-valve module showing that a low-flow membrane has been mounted in a membrane receiver formed in the fluid-flow unit of the elevated remote breather-valve module to provide a low-flow vent in the elevated remote breather-valve module.
Figure 9:
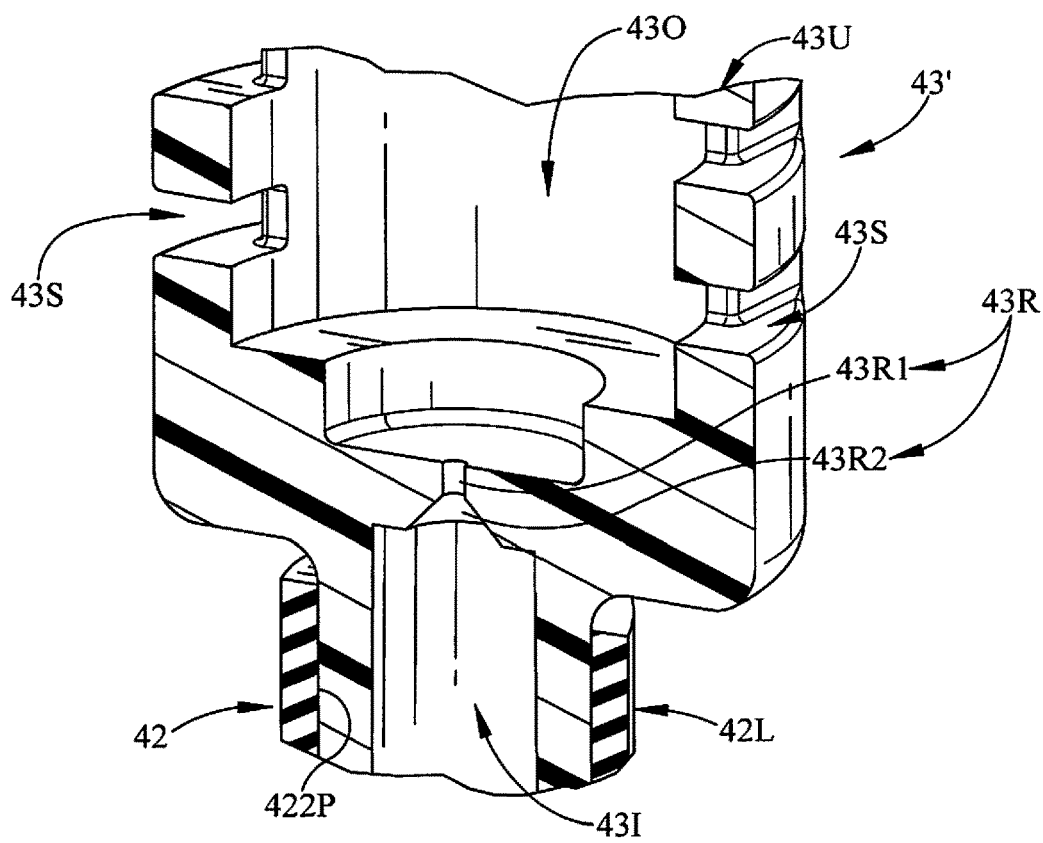
FIG. 9 is a sectional view similar to FIG. 8 showing that the membrane receiver formed in the fluid-flow unit of the elevated remote breather-valve module is empty to provide a high-flow vent in the elevated remote breather-valve module.

Flow restrictor channel 43R comprises a first and second passages 43R1, 43R2 as suggested in FIG. 8. First passage 43R1 has a uniform internal diameter of about 0.6 millimeters in an illustrative embodiment and communicates with outer chamber 430 as suggested in FIG. 8. Second passage 43R2 is a nozzle that interconnects first passage 43R1 and inner chamber 431 in fluid communication and is bounded by a conical side wall that diverges toward inner chamber 431 as suggested in FIG. 8.

Elevated remote breather-valve module 43 also includes a semi-permeable membrane 43M that is mounted in inner chamber 431 as suggested in FIG. 8. Membrane 43M comprises three layers in an illustrative embodiment for use in low-flow applications. Semi-permeable membrane 43M is configured to provide breathing means for regulating flow of air from atmosphere 11 into interior region 32 of DEF tank 30 through vapor-transfer and fill-limit valve modules 42, 41 to maintain a selected positive vapor pressure in interior region 32 without exposing diesel exhaust fluid 12 to enough air to change from a normal liquid state to an unwanted crystalline state and also for regulating discharge of fluid vapor 12V from interior region 32 of DEF tank 30 to atmosphere 11 through fill-limit valve and vapor-transfer modules 41, 42 to block development of a vapor pressure in interior region 32 in excess of a selected maximum pressure.

DEF tank venting control unit 40 is arranged to extend into interior region 32 of DEF tank 30 through a single unit-mount aperture 35 formed in a top wall 37 of DEF tank 30 as suggested in FIGS. 2 and 6. Fill-limit valve module 41 of DEF tank venting control unit 40 is located substantially in interior region 32 of DEF tank 30 and is exposed to diesel exhaust fluid 12 and fluid vapor 12V extant in interior region 32 as suggested in FIG. 2. The elevated remote breather-valve module 43 of unit 40 is located outside of interior region 32 in an illustrative embodiment and is formed to include an outer chamber 430 in fluid communication with atmosphere 11 as suggested in FIG. 4.

The elevated remote breather-valve module 43 includes a semi-permeable membrane 43M that is arranged to communicate fluidly with an interior chamber 420C formed in vapor-transfer module 42 and inner chamber 431 formed in the elevated remote breather-valve module 43 as shown in FIG. 8. Semi-permeable membrane 43M is configured to (1) block flow of liquid fluid 12 from interior chamber 42C into inner chamber 431, (2) allow some fluid vapor 12V to pass from interior chamber 42C to atmosphere 11 through inner chamber 431 as long as a positive pressure is maintained in interior region 32 of DEF tank 30, and (3) allow some air to pass from atmosphere 11 into interior region 32 of DEF tank 30 in sequence through inner chamber 431, interior chamber 42C, and the fill-limit valve module 41 to dissipate any unwanted negative pressure (i.e., vacuum) that might develop in interior region 32 of DEF tank 30 owing to exposure of DEF tank 30 to various external environmental conditions such as, for example, cool evening temperatures and without causing crystallization of the liquid diesel exhaust fluid 12 stored in DEF tank 30.

DEF tank venting control unit 40 includes a body 60 and a fill-limit vent valve 62 as suggested in FIGS. 4 and 6. Fill-limit valve 62 comprises a float 64 and a closure 66 coupled to an upper portion of float 64 and arranged to move up and down on liquid diesel exhaust fluid 12 admitted from inferior region 32 of DEF tank 30 into a float chamber 68 formed in a lower portion of body 60 to receive float 64 therein as suggested in FIG. 4.

An illustrative exhaust after-treatment system 100 is shown diagrammatically in FIG. 1. System 100 is associated with diesel engine 10 and comprises DEF storage unit 10.

Exhaust pipe 16 is configured to mate with and receive exhaust product 22 discharged from diesel engine 18 through an exhaust output part 18P formed in diesel engine 18 as suggested in FIG. 1. Exhaust pipe 16 comprises, in series, an upstream conduit 161, a diesel particulate filter 25, a midstream conduit 162, a selective catalytic reduction (SCR) converter 26, and a downstream conduit 163 as suggested in FIG. 1. Exhaust product 20 discharged from diesel engine 18 and flowing through upstream exhaust conduit 161 comprises nitrogen oxides (NO$_x$) and particulate matter (PM). The particulate matter is trapped in diesel particulate trap 25. Owing to operation of converter 26 and metered discharge of diesel exhaust fluid 12 into mixing zone 14 in midstream conduit 162, filtered exhaust product 21 flowing away from diesel particulate trap 25 through midstream conduit 162 is converted in SCR converter 26 to water and nitrogen for discharge from exhaust pipe 16 through downstream conduit 163 as suggested in FIG. 1.

Diesel exhaust fluid (DEF) transfer system 110 provides means for injecting a metered flow of diesel exhaust fluid 12 discharged from DEF tank 30 into the mixing zone 14 formed in midstream conduit 162 of filler neck 16 as suggested in FIG. 1. In illustrative embodiments, DEF transfer system 110 comprises, in series, a discharge conduit 111, a fluid pump 112, a fluid meter 113, and a fluid-discharge nozzle 114 coupled in fluid communication to mixing zone 14 as suggested in FIG. 1. In illustrative embodiments, the diesel exhaust fluid 12 discharged into mixing zone 14 hydrolyzes into ammonia gas (NH$_3$) which mixes with flowing exhaust product 20 to produce a mixture 22 that flows into SCR converter 26. Ammonia (NH$_3$) and Nitrogen Oxides (NO$_x$) react with the catalyst 24 provide in SCR converter 26 to form nitrogen and water.

During tank refilling activity (before shutoff), fluid-dispensing pump nozzle 54 is on and dispenses liquid diesel exhaust fluid 12 into interior region 32 of DEF tank 30. Fluid level rises in interior region 32 of DEF tank 30 to displace air and fuel vapor exhaust in interior region 32. Fuel vapor 12V exits interior region 32 through first and second vent apertures 60V1, 60V2 formed in body 60 and flows through float chamber 68 to vapor recirculation line 34 and tank filler neck 36. Vent apertures 60V1, 60V2 are shown, for example, in FIGS. 2, 3, and 5A.

At shutoff, float 64 has risen in float chamber 68 to cause closure 66 to close the aperture opening into interior chamber 420C formed in vapor-transfer module 42. This closure increases pressure in interior region 32 of DEF tank 30 and provides shutoff for DEF delivery system 50 in a normal way.

A breathing operation begins in the elevated remote breather-valve module 43 (after shutoff). The elevated remote breather-valve module 43 restricts discharge of fluid vapor 12V and liquid diesel exhaust fluid 12 to atmosphere 11 through outer chamber 430 but allows DEF tank 30 to breath so as to minimize unwanted high-pressure and negative-pressure conditions that might otherwise develop in DEF tank 30 under certain operating conditions. Air and fluid vapor 12V are able to flow between atmosphere 11 and interior region 32 of DEF tank 30 in accordance with predetermined flow criteria established by design of the elevated remote breather-valve module 43 via the interior chamber 42C of vapor-transfer module 42 during normal operating conditions of system 100.

DEF tank venting control valve 40 is configured to manage operation venting of DEF tank 30 to provide compensation of vacuum created by the delivery pump and compensation of over/under pressure created by environmental changes (e.g. temperature, atmospheric pressure, etc.). DEF tank venting control valve 40 is also configured to manage refilling ventilation to provide ventilation of DEF tank 30 during refilling and stop ventilation after fluid 12 in DEF tank reaches a defined fill level.

Diesel exhaust fluid storage unit 10 is adapted to supply a metered amount of diesel exhaust fluid 12 provided in a diesel exhaust fluid tank 30 to a mixing zone 14 in an exhaust pipe 16 coupled to a diesel engine 18 as suggested in FIG. 1. Diesel exhaust fluid storage unit 10 comprises a diesel exhaust fluid tank venting control unit 40 formed to include a fill-limit valve module 41 adapted to receive diesel exhaust fluid 12 from diesel exhaust fluid tank 30, an elevated breather-valve module 43 exposed to the atmosphere 11, and a vapor-transfer module 42 interposed between and coupled in fluid communication to each of fill-limit valve module 41 and the elevated breather-valve module 43 as suggested in FIGS. 3, 6, and 7. Breather-valve module 43 includes an interior chamber 431 and, in an embodiment shown in FIG. 8, a semi-permeable membrane 43M having a topside exposed to atmospheric air 11 admitted into interior chamber 431 and an underside exposed to fluid vapor 12V associated with diesel exhaust fluid 12 in diesel exhaust fluid tank 30 and fluid vapor 12V conducted through vapor-transfer module 42. No semi-permeable membrane is located in interior chamber 431 of breather-valve module 43' in an embodiment shown in FIG. 9.

Breather-valve module 43 is supported in an elevated position in vertically spaced-apart relation to diesel exhaust fluid tank 30 as shown, for example, in FIGS. 2 and 6. Vapor-transfer module 42 includes a breather-valve transfer tube 422 formed to include a fluid-conducting passageway 422P to conduct fluid vapor 12V in an upward direction between diesel exhaust fluid tank 30 and the elevated breather-valve module 43. Breather-valve transfer tube 422 may be made of a rigid material to support the breather-valve module 43 in the elevated position above the diesel exhaust fluid tank 30.

Figure 5A:
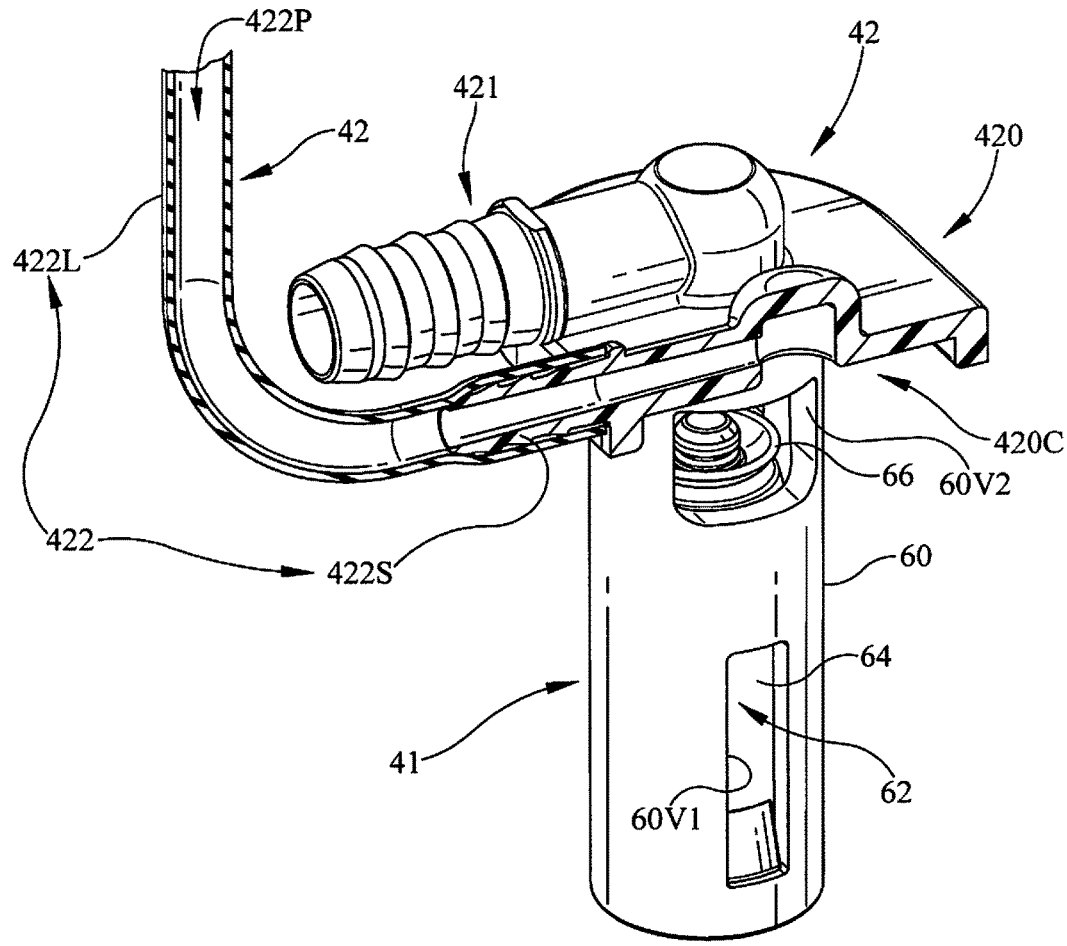
FIG. 5A is an enlarged partial sectional view of a portion of the DEF tank venting control unit taken along line 5A-5A of FIG. 3 suggesting that the tall L-shaped breather-valve transfer tube is used to conduct vapor out of and away from the DEF tank to the elevated remote breather-valve module.

Breather-valve transfer tube 422 is L-shaped and includes first and second tubular legs 422S, 422L as shown, for example, in FIGS. 3 and 5A. First tubular leg 422S is horizontal and formed to include an inlet exposed to fluid vapor 12V extant in diesel exhaust fluid tank 30 and arranged to open into the fuel-conducting passageway 422P as shown in FIGS. 5A and 6. The relatively longer second tubular leg 422L is arranged to interconnect a distal end of first tubular leg 422S and the elevated breather-valve module 43. Breather-valve module 43 is formed to include an outlet opening into the fluid-conducting passageway 422P and communicating with interior chamber 431 of breather-valve module 43 as shown in FIG. 5B.

Vapor-transfer module 42 includes a short filler-neck transfer tube 421 having an inlet exposed to fluid vapor 12V in diesel exhaust fluid tank 30 and adapted to be coupled to a tank filler neck 36 associated with diesel exhaust fluid tank 30 via a vapor recirculation line 34 as shown in FIG. 2. Breather-valve transfer tube 422 is longer than the short filler-neck transfer tube 421 as shown, for example, in FIG. 3. Breather-valve transfer tube 422 has an inlet also exposed to fluid vapor 12V in diesel exhaust fluid tank 30 and is arranged to extend away from diesel exhaust fluid tank 30 to conduct fluid vapor 12V to the elevated breather-valve module 43. First tubular leg 422S is arranged to lie in spaced-apart parallel relation to the short filler-neck transfer tube 421. Second tubular leg 422L is arranged to interconnect a distal end of the first tubular leg 422S and the elevated breather-valve module 43 located above the diesel exhaust fluid tank 30.

Vapor-transfer module 42 further includes a cap 420 mounted on diesel exhaust fluid tank 30 to cover an aperture formed in diesel exhaust fluid tank 30. Inlet of short filler-neck transfer tube 421 is coupled to cap 420 as suggested in FIGS. 2, 3, and 6. Inlet of the separate relatively longer breather-valve transfer tube 422 is formed in the horizontal first tubular leg 422S and coupled to cap 420.

Fill-limit valve module 41 is coupled to an underside of cap 420 and arranged to extend downwardly into an interior region 32 formed in diesel exhaust fluid tank 30 as shown, for example, in FIGS. 2 and 6. Breather-valve module 43 is arranged to lie in a remote location separated from cap 420. Vapor-transfer module 42 further includes a breather-valve transfer tube 422 coupled at one end to cap 420 and at an opposite end to breather-valve module 43. Breather-valve transfer tube 422 is formed to include a fluid-conducting passageway 422P to conduct fluid vapor 12V between interior region 32 of diesel exhaust fluid tank 30 and breather-valve module 43.

Breather-valve module 43 is supported in an elevated position above cap 420 of vapor-transfer module 42 and diesel exhaust fluid tank 30 to lie in spaced-apart relation to any liquid fluid 12 sloshing about in interior region 32 of diesel exhaust fluid tank 30 as suggested in FIG. 2. Breather-valve module 43 includes an inner chamber 431 open to breather-valve transfer tube 422, an outer chamber 430 open to atmosphere 11 surrounding breather-valve module 43, and a flow restrictor channel 43R arranged to interconnect inner and outer chambers 431, 430 in fluid communication.

Flow restrictor channel 43R comprises a fluid-conducting passageway 43R1 having an internal diameter of about 0.6 millimeters. Flow restrictor channel 43R further includes a fluid-conducting nozzle 43R2 coupled in fluid communication to fluid-conducting passageway 43R1.

A semipermeable membrane 43M is arranged to lie in spaced-apart relation to fluid-conducting passageway 43R1 to locate fluid-conducting nozzle 43R2 therebetween in an embodiment in accordance with the present disclosure that is shown in FIG. 8. The semi-permeable membrane 43M is mounted in the inner chamber 431 of breather-valve module 43. The semi-permeable membrane 43M has three horizontally extending layers.

Breather-valve module 43 is formed to include an inner chamber 431 that is arranged to open downwardly toward the fluid-conducting passageway 43R1 formed in breather-valve transfer tube 422 included in vapor-transfer module 42. Fluid-conducting passageway is adapted to communicate with interior region of diesel exhaust fluid tank 30 when diesel exhaust tank venting control unit 40 is mounted in an aperture formed in a wall of diesel exhaust fluid tank 30.

Breather-valve module 43 includes an outer chamber 430 open to atmosphere 11 surrounding breather-valve module 43 via side opening 43S, an inner chamber 431, and a flow restrictor channel 43R arranged to interconnect outer and inner chambers 430, 431. Vapor-transfer module 42 is formed to include a fluid-conducting passageway 422P that is arranged to interconnect inner chamber 431 of breather-valve module 43 and an interior region 32 of diesel exhaust fluid tank 30 and is elongated to provide spatial means for locating outer chamber 430 of breather-valve module 43 at a far enough distance from diesel exhaust fluid tank 30 to block transfer of any sloshing liquid diesel exhaust fluid 12 in diesel exhaust fluid tank 30 into outer chamber 430 via fluid-conducting passageway 422P, inner chamber 431, and flow restrictor channel 43R.

Vapor-transfer module 42 includes a cap 420 mounted on diesel exhaust fluid tank 30 to cover an aperture 35 formed in diesel exhaust fluid tank 30 as shown, for example, in FIGS. 2 and 6. Fill-limit valve module 41 is coupled to an underside of cap 420 and arranged to extend downwardly into an interior region 32 formed in diesel exhaust fluid tank 30. Breather-valve module 43 is arranged to lie in a remote location separated from cap 420. Vapor-transfer module 42 further includes a breather-valve transfer tube 422 coupled at one end to cap 420 and at an opposite end to breather-valve module 43 and formed to include the fluid-conducting passageway 422P to conduct fluid vapor 12V between interior region 32 of diesel exhaust fluid tank 30 and breather-valve module 43.

The invention claimed is:

1. A diesel exhaust fluid storage unit adapted to supply a metered amount of diesel exhaust fluid provided in a diesel exhaust fluid tank to a mixing zone in an exhaust pipe coupled to a diesel engine, the diesel exhaust fluid storage unit comprising
a diesel exhaust fluid tank venting control unit formed to include a fill-limit valve module adapted to receive diesel exhaust fluid from a diesel exhaust fluid tank and formed to include a float chamber exposed to diesel exhaust fluid in the diesel exhaust fluid tank and a float arranged to move upwardly in the float chamber from a lowered position opening an inlet into a filler-neck transfer tube associated with a tank filler neck coupled to the diesel exhaust fluid tank to a raised position closing the inlet in response to a rising level of diesel exhaust fluid in the float chamber, a breather-valve module exposed to the atmosphere, and a vapor-transfer module interposed between the fill-limit valve module and the breather-valve module and separated from the float chamber of the fill-limit valve module, wherein the breather-valve module includes an interior chamber and a semi-permeable membrane having a topside exposed to atmospheric air admitted into the interior chamber and an underside exposed to fluid vapor that is associated with diesel exhaust fluid in the diesel exhaust fluid tank and is conducted from the diesel exhaust fluid tank through the vapor-transfer module without passing through the float chamber of the fill-limit valve module.

2. The diesel exhaust fluid storage unit of claim 1, wherein the breather-valve module is supported in an elevated position in vertically spaced-apart relation to the diesel exhaust fluid tank and the vapor-transfer module includes a breather-valve transfer tube formed to include a fluid-conducting passageway to conduct fluid vapor in an upward direction between the diesel exhaust fluid tank and the breather-valve module in the elevated position without passing through the float chamber of the fill-limit valve module.

3. The diesel exhaust fluid storage unit of claim 1, wherein the vapor-transfer module includes a cap mounted on the diesel exhaust fluid tank to cover an aperture formed in the diesel exhaust fluid tank, the fill-limit valve module is coupled to an underside of the cap and arranged to extend downwardly into an interior region formed in the diesel exhaust fluid tank, the breather-valve module is arranged to lie in a remote location separated from the cap, and the vapor-transfer module further includes a breather-valve transfer tube coupled at one end to the cap and at an opposite end to the breather-valve module and formed to include a fluid-conducting passageway to conduct fluid vapor between the interior region of the diesel exhaust fluid tank and the breather-valve module without passing through the float chamber of the fill-limit valve module.

4. The diesel exhaust fluid storage unit of claim 3, wherein the breather-valve module is supported in an elevated position above the cap of the vapor-transfer module and the diesel exhaust fluid tank to lie in spaced-apart relation to any liquid fluid sloshing about in the interior region of the diesel exhaust fluid tank.

5. The diesel exhaust fluid storage unit of claim 4, wherein the breather-valve transfer tube of the vapor-transfer module is L-shaped and includes a first tubular leg coupled to the cap and a relatively longer second tubular leg arranged to interconnect a distal end of the first tubular leg and the breather-valve module.

6. A diesel exhaust fluid storage unit adapted to supply a metered amount of diesel exhaust fluid provided in a diesel exhaust fluid tank to a mixing zone in an exhaust pipe coupled to a diesel engine, the diesel exhaust fluid storage unit comprising a diesel exhaust fluid tank venting control unit formed to include a fill-limit valve module adapted to receive diesel exhaust fluid from a diesel exhaust fluid tank, a breather-valve module exposed to the atmosphere, and a vapor-transfer module interposed between and coupled in fluid communication to each of the fill-limit valve module and the breather-valve module, wherein the breather-valve module includes an interior chamber and a semi-permeable membrane having a topside exposed to atmospheric air admitted into the interior chamber and an underside exposed to fluid vapor associated with diesel exhaust fluid in the diesel exhaust fluid tank and fluid vapor conducted through the vapor-transfer module, wherein the breather-valve module is supported in an elevated position in vertically spaced-apart relation to the diesel exhaust fluid tank and the vapor-transfer module includes a breather-valve transfer tube formed to include a fluid-conducting passageway to conduct fluid vapor in an upward direction between the diesel exhaust fluid tank and the breather-valve module in the elevated position, and wherein the breather-valve transfer tube includes a horizontal first tubular leg made of a rigid material and formed to include an inlet exposed to fluid vapor extant in the diesel exhaust fluid tank and arranged to open into the fuel-conducting passageway and a relatively longer second tubular leg made of a flexible material and arranged to interconnect a distal end of the first tubular leg and the breather-valve module and formed to include an outlet opening into the fluid-conducting passageway and communicating with the interior chamber of the breather-valve module.

7. The diesel exhaust fluid storage unit of claim 6, wherein the breather-valve module is clamped to a vapor recirculation line that is coupled at one end to the vapor-transfer module and at another end to a tank filler neck associated with the diesel exhaust fluid tank to support the breather-valve module in the elevated position above the diesel exhaust fluid tank.

8. A diesel exhaust fluid storage unit adapted to supply a metered amount of diesel exhaust fluid provided in a diesel exhaust fluid tank to a mixing zone in an exhaust pipe coupled to a diesel engine, the diesel exhaust fluid storage unit comprising a diesel exhaust fluid tank venting control unit formed to include a fill-limit valve module adapted to receive diesel exhaust fluid from a diesel exhaust fluid tank, a breather-valve module exposed to the atmosphere, and a vapor-transfer module interposed between and coupled in fluid communication to each of the fill-limit valve module and the breather-valve module, wherein the breather-valve module includes an interior chamber and a semi-permeable membrane having a topside exposed to atmospheric air admitted into the interior chamber and an underside exposed to fluid vapor associated with diesel exhaust fluid in the diesel exhaust fluid tank and fluid vapor conducted through the vapor-transfer module, and wherein the vapor-transfer module includes a short filler-neck transfer tube having an inlet exposed to fluid vapor in the diesel exhaust fluid tank and adapted to be coupled to a tank filler neck associated with the diesel exhaust fluid tank via a vapor recirculation line and a separate relatively longer breather-valve transfer tube having an inlet also exposed to fluid vapor in the diesel exhaust fluid tank and extending upwardly away from the diesel exhaust fluid tank to conduct fluid vapor to the breather-valve module.

9. The diesel exhaust fluid storage unit of claim 8, wherein the breather-valve transfer tube includes a horizontal first tubular leg arranged to lie in spaced-apart parallel relation to the short filler-neck transfer tube and an upright second tubular leg arranged to interconnect a distal end of the first tubular leg and the breather-valve module in an elevated position above the diesel exhaust fluid tank.

10. The diesel exhaust fluid storage unit of claim 9, wherein the vapor-transfer module further includes a cap mounted on the diesel exhaust fluid tank to cover an aperture formed in the diesel exhaust fluid tank, the inlet of the short filler-neck transfer tube is coupled to the cap, and the inlet of the separate relatively longer breather-valve transfer tube is formed in the horizontal first tubular leg and coupled to the cap.

11. The diesel exhaust fluid storage unit of claim 9, wherein the breather-valve transfer tube is arranged to extend along the vapor recirculation line.

12. A diesel exhaust fluid storage unit adapted to supply a metered amount of diesel exhaust fluid provided in a diesel exhaust fluid tank to a mixing zone in an exhaust pipe coupled to a diesel engine, the diesel exhaust fluid storage unit comprising a diesel exhaust fluid tank venting control unit formed to include a fill-limit valve module adapted to receive diesel exhaust fluid from a diesel exhaust fluid tank, a breather-valve module exposed to the atmosphere, and a vapor-transfer module interposed between and coupled in fluid communication to each of the fill-limit valve module and the breather-valve module, wherein the breather-valve module includes an interior chamber and a semi-permeable membrane having a topside exposed to atmospheric air admitted into the interior chamber and an underside exposed to fluid vapor associated with diesel exhaust fluid in the diesel exhaust fluid tank and fluid vapor conducted through the vapor-transfer module, wherein the vapor-transfer module includes a cap mounted on the diesel exhaust fluid tank to cover an aperture formed in the diesel exhaust fluid tank, the fill-limit valve module is coupled to an underside of the cap and arranged to extend downwardly into an interior region formed in the diesel exhaust fluid tank, the breather-valve module is arranged to lie in a remote location separated from the cap, and the vapor-transfer module further includes a breather-valve transfer tube coupled at one end to the cap and at an opposite end to the breather-valve module and formed to include a fluid-conducting passageway to conduct fluid vapor between the interior region of the diesel exhaust fluid tank and the breather-valve module, wherein the breather-valve module is supported in an elevated position above the cap of the vapor-transfer module and the diesel exhaust fluid tank to lie in spaced-apart relation to any liquid fluid sloshing about in the interior region of the diesel exhaust fluid tank, and wherein the breather-valve module includes an inner chamber open to the breather-valve transfer tube, an outer chamber open to atmosphere surrounding the breather-valve module, and a flow restrictor channel arranged to interconnect the inner and outer chambers in fluid communication.

13. The diesel exhaust fluid storage unit of claim 12, wherein the flow restrictor channel nozzle comprises a fluid-conducting passageway having an internal diameter of about 0.6 millimeters.

14. The diesel exhaust fluid storage unit of claim 13, wherein the flow restrictor channel further includes a fluid-conducting nozzle coupled in fluid communication to the fluid-conducting passageway and the semipermeable membrane is arranged to lie in spaced-apart relation to the fluid-conducting passageway to locate the fluid-conducting nozzle therebetween.

15. The diesel exhaust fluid storage unit of claim 12, wherein the semi-permeable membrane is mounted in the inner chamber of the breather-valve module.

16. The diesel exhaust fluid storage unit of claim 12, wherein the semi-permeable membrane has three horizontally extending layers.

17. A diesel exhaust fluid storage unit adapted to supply a metered amount of diesel exhaust fluid provided in a diesel exhaust fluid tank to a mixing zone in an exhaust pipe coupled to a diesel engine, the diesel exhaust fluid storage unit comprising a diesel exhaust fluid tank venting control unit formed to include a fill-limit valve module adapted to receive diesel exhaust fluid from a diesel exhaust fluid tank, a breather-valve module exposed to the atmosphere, and a vapor-transfer module interposed between and coupled in fluid communication to each of the fill-limit valve module and the breather-valve module, wherein the breather-valve module includes an interior chamber and a semi-permeable membrane having a topside exposed to atmospheric air admitted into the interior chamber and an underside exposed to fluid vapor associated with diesel exhaust fluid in the diesel exhaust fluid tank and fluid vapor conducted through the vapor-transfer module, wherein the vapor-transfer module includes a cap mounted on the diesel exhaust fluid tank to cover an aperture formed in the diesel exhaust fluid tank, the fill-limit valve module is coupled to an underside of the cap and arranged to extend downwardly into an interior region formed in the diesel exhaust fluid tank, the breather-valve module is arranged to lie in a remote location separated from the cap, and the vapor-transfer module further includes a breather-valve transfer tube coupled at one end to the cap and at an opposite end to the breather-valve module and formed to include a fluid-conducting passageway to conduct fluid vapor between the interior region of the diesel exhaust fluid tank and the breather-valve module, and wherein the breather-valve module is formed to include an inner chamber that is arranged to open downwardly toward the fluid-conducting passageway formed in the breather-valve transfer tube included in the vapor-transfer module and adapted to communicate with an interior region of the diesel exhaust fluid tank when the diesel exhaust tank venting control unit is mounted in an aperture formed in a wall of the diesel exhaust fluid tank and the semi-permeable membrane is mounted in the inner chamber of the breather-valve module.

18. The diesel exhaust fluid storage unit of claim 17, wherein the semi-permeable membrane has three horizontally extending layers.

19. A diesel exhaust fluid storage unit adapted to supply a metered amount of diesel exhaust fluid provided in a diesel exhaust fluid tank to a mixing zone in an exhaust pipe coupled to a diesel engine, the diesel exhaust fluid storage unit comprising a diesel exhaust fluid tank venting control unit formed to include a fill-limit valve module adapted to receive diesel exhaust fluid from a diesel exhaust fluid tank, a breather-valve module exposed to the atmosphere, and a vapor-transfer module interposed between the fill-limit valve module and the breather-valve module, wherein the breather-valve module includes an outer chamber open to atmosphere surrounding the breather-valve module, an inner chamber, and a flow restrictor channel arranged to interconnect the outer and inner chamber and the vapor-transfer module is formed to include a fluid-conducting passageway that is arranged to interconnect the inner chamber of the breather-valve module and an interior region of the diesel exhaust fluid tank and is elongated to provide spatial means for locating the outer chamber of the breather-valve module at a far enough distance from the diesel exhaust fluid tank to block transfer of any sloshing liquid diesel exhaust fluid in the diesel exhaust fluid tank into the outer chamber via the fluid-conducting passageway, inner chamber, and the flow restrictor channel.

20. The diesel exhaust fluid storage unit of claim 19, wherein the vapor-transfer module includes a cap mounted on the diesel exhaust fluid tank to cover an aperture formed in the diesel exhaust fluid tank, the fill-limit valve module is coupled to an underside of the cap and arranged to extend downwardly into an interior region formed in the diesel exhaust fluid tank, the breather-valve module is arranged to lie in a remote location separated from the cap, and the vapor-transfer module further includes a breather-valve transfer tube coupled at one end to the cap and at an opposite end to the breather-valve module and formed to include the fluid-conducting passageway to conduct fluid vapor between the interior region of the diesel exhaust fluid tank and the breather-valve module.

21. The diesel exhaust fluid storage unit of claim 20, wherein the breather-valve transfer tube of the vapor-transfer module is L-shaped and includes a first tubular leg coupled to the cap and a relatively longer second tubular leg arranged to interconnect a distal end of the first tubular leg and the breather-valve module.

22. The diesel exhaust fluid storage unit of claim 19, wherein a semi-permeable membrane is mounted in the inner chamber of the breather-valve module.

23. The diesel exhaust fluid storage unit of claim 19, wherein the semi-permeable membrane has three horizontally extending layers.

* * * * *